Oct. 29, 1968   J. J. MANGANELLO ET AL   3,408,252
PROCESS OF BONDING ORGANIC COMPOSITIONS TO FERROUS METAL
SURFACES AND ARTICLE PRODUCED THEREBY
Filed March 31, 1965
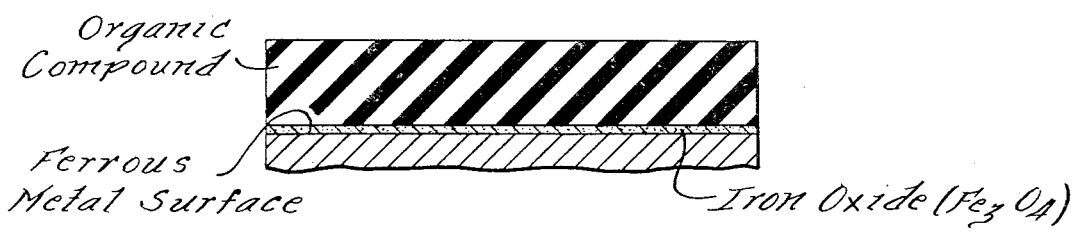
INVENTORS.
James J. Manganello
Louis T. Feng
BY
Harness and Harris
ATTORNEYS.

3,408,252
PROCESS OF BONDING ORGANIC COMPOSITIONS TO FERROUS METAL SURFACES AND ARTICLE PRODUCED THEREBY
James J. Manganello, Birmingham, and Louis T. Feng, Southfield, Mich., assignors to Chrysler Corporation, Highland Park, Mich., a corporation of Delaware
Filed Mar. 31, 1965, Ser. No. 444,394
15 Claims. (Cl. 161—225)

ABSTRACT OF THE DISCLOSURE

A process for bonding organic compositions to a material having a ferrous metal surface which comprises forming a coating of magnetic iron oxide on the ferrous metal surface by treating the surface with an oxidizing agent and then applying the organic composition to the oxide coated surface.

---

This invention relates to a process for bonding together two or more materials. In particular, it relates to the bonding of materials to ferrous metal surfaces. More particularly, this invention relates to a process for bonding organic materials to ferrous metal surfaces which results in greatly increased adhesion of the organic material. This invention finds special utility in the bonding of rubber to sintered ferrous metal surfaces produced from metal powders.

The difficulty of bonding materials, as for example, metals, paints, lacquers, enamels, rubber adhesives, and synthetic resins such as epoxy, polyurethane and vinyl, to ferrous metal surfaces is well-known. Thus, in order to produce a good paint bond it has become common practice to phosphate coat the metal surface or, as in the case of smooth, clean metal surfaces that cannot be phosphate coated, to apply a special primer coat. These methods are not entirely satisfactory, however, because such preparatory coatings must be of the highest quality since all subsequent steps in the preparation and protection of the metal surface will be performed on the preparatory coating, and the time involved and the cost of producing such quality coating presents a serious economic obstacle when the object to be coated is of little monetary value, such as for example, children's toys. Furthermore, the porous structure encountered in many ferrous metal parts does not permit the application of a good quality preparatory coating.

A further problem is presented in producing bonded, rubber-metal units, which are in ever increasing demand as vibration dampers, noise suppressors and shock load absorbers. The nature of this problem is that while rubber may readily adhere to certain metals such as copper and brass, it will not readily adhere to iron or steel. Accordingly, it has become common practice when fabricating rubber-ferrous metal units to plate the ferrous metal with copper or brass and then bond the rubber to the metal plating. Such a procedure, however, is both time-consuming and expensive.

It is an object of this invention, therefore, to provide a process for bonding materials to ferrous metal surfaces.

A further object is to provide a bonding process which will result in a greatly increased adherence of organic compositions to ferrous metal surfaces compared to presently used bonding processes.

An additional object is to provide a bonding process which is convenient and easy to carry out and which can be practiced efficiently and economically.

A still further object is to provide a bonding process which will produce an outstanding and consistent adhesion of rubber to sintered ferrous metal surfaces.

It has been found as a surprising and unobvious fact that an excellent bond is obtained between organic compositions and ferrous metal surfaces if the ferrous metal is coated with a layer of iron oxide. This discovery was totally unexpected since it is commonly taught that all oxide scale must be removed from metallic surfaces before the metal can be bonded with other materials.

Accordingly, as seen with reference to the single figure of the accompanying drawing, the process of this invention comprises forming a layer of iron oxide on the surface of a ferrous metal and then applying the organic composition to the oxide coated surface. The oxide layer must be a particular form of iron oxide, namely, magnetic ferritic oxide ($Fe_3O_4$). It has been found that the process of this invention permits great flexibility in that the oxide coated metal can be immediately contacted with the organic composition or it can be stored and bonded with the organic composition at a later date with no requirement of additional treatment. The organic composition can be applied to the oxide coated metal by conventional techniques such as spraying, brushing or dipping and the application of the organic composition need not be carried out under any special conditions of temperature and pressure. Due to the physical nature of the oxide coating, a high degree of adherence will be obtained, as well as excellent appearance, when paint is directly applied to the oxide coated surface.

A critical feature of the present invention involves the necessity of having an iron oxide coating on the surface of the ferrous metal. As mentioned above, this iron oxide is of a particular form and is produced by directly contacting the ferrous metal with a suitable oxidizing gas or vapor such as steam, carbon dioxide, oxygen or mixtures of these. Preferably, steam is used as the oxidizing agent and the ensuing discussion will be based on the use of steam as the oxidizing agent, although it is applicable to the other oxidizers. At this point, it should be understood that the iron oxide formation which is necessary in the process of this invention is totally different from the oxide generally associated with ferrous metal and which is commonly referred to as "rust" (FeO). In fact, prior to contacting the ferrous metal with steam, the metal should be cleaned so as to remove all traces of rust. After the metal has been cleaned, it is brought into direct contact with steam. In order to form the desired oxide coating the metal surface should be at a temperature of at least 400° F. when contacted with the oxidizing agent. Likewise, air, which may cause rusting, should preferably not be in contact with the metal surface during the steaming of the metal surface. This is especially true when the metal surface exceeds a temperature of about 800° F.

In order to achieve good uniform oxide coatings in a reasonably short length of time, the ferrous metal should be heated so that the metal surface temperature is at least about 400° F. prior to its being contacted with steam. Even more preferable is a temperature in the range of from about 700° F. to about 1200° F. If oxygen is used as the oxidizing agent, it has been found that temperatures in the lower end of the range are preferable, while temperatures in the upper end of the range are preferable if carbon dioxide is used since carbon dioxide is a slower oxidizing agent than oxygen. Excellent results have been achieved in forming the oxide coating with steam on sintered ferrous metal parts produced from metal powders when the metal surface temperature was in the range of about 1000° F. to 1100° F. The length of time needed in order to produce a good oxide coating by contacting the metal with steam is not critical and will vary considerably with the size, shape and porosity of the metal involved. In general, good coatings are produced by steaming the metal for a period ranging from about 5 minutes up to about 150 minutes. The exact period of time required is easily determined in practice through visual inspection since the desired oxide forms a distinctive blue-black coating. The thickness of the coating which is needed in the practice of this invention is usually not critical but in general has been found to be in the range of about 0.05 to 0.3 mil. While the coating thickness is not critical, it is important that the oxide cover the entire surface which is to be bonded to the rubber-like or other surface.

The temperature and pressure of the steam which is used in the process of this invention are not particularly critical. Naturally, the steam temperature should be above 212° F. However, no advantage has been found in using steam having a higher temperature than that of the heated metal surface which is to be contacted. Likewise, since it is desirable to exclude air from the metal surface during steaming, it is advantageous to use a steam pressure in excess of atmospheric. High pressure steam may be used, the exact pressure being governed only by equipment design and economic considerations.

A convenient method of forming the oxide coating is to heat a furnace to a temperature of 400° F. or higher and then charge the ferrous metal parts into the furnace. After the parts have come to temperature, steam is injected into the furnace to circulate about the parts and, at the same time, purge air from the work chamber. At the end of a period of between 5 to 150 minutes the oxide coated parts are allowed to cool to room temperature. It has been found that if the parts are to be heated above about 800° F., it is advisable to circulate steam through the furnace work chamber so as to purge the air therefrom prior to charging the parts to the furnace. This procedure is recommended since the undesirable rust, mentioned above, forms relatively quickly at elevated temperatures in an air-steam atmosphere.

Having formed the iron oxide coating on the surface of the ferrous metal, the next step in the process of this invention is to apply the desired organic composition to the metal. This may be done by any of the conventional techniques mentioned herein above. Examples of such organic compositions are amino-resin-modified alkyds, nitrocellulose lacquers, rubber cements, acrylics, epoxies, polyurethanes and vinyls.

The process of this invention has found special application in the bonding of rubber, both natural and synthetic, to sintered ferrous metal surface. The term "sintered ferrous metal" refers to a solid metal material which has been produced by compacting and sintering a powdered ferrous metal. Heretofore in attempting to produce a rubber-sintered metal bonded part, the various rubber-ferrous metal bonding processes known in the art such as grit blasting, metal plating and phosphatizing were used without success. The parts produced by these known processes varied widely in the bond strength, which even in the best pieces was very poor. In one application of the process of this invention, the sintered metal part is cleaned and heated to a temperature in the range of about 400° F. to 1200° F. prior to its being transferred to a furnace which has been brought to a temperature in the range of about 400° F. to 1200° F. with air atmosphere and then held at this temperature while steam is injected to purge air from the furnace work chamber. The sintered metal part is then placed into this furnace where it is directly contacted by steam in the absence of air. After a period of about 5 to 150 minutes of such direct steam contact, the steam is turned off and the oxide-coated sintered metal part is allowed to cool in air to room temperature. Upon cooling, the part is then coated with at least one layer of a rubber cement or similar adhesive and the desired rubber or rubber-like covering is brought into contact with the rubber cement through the conventional practice of molding rubber goods or by injecting the rubber or rubber-like material under pressure into a closed mold. Rubber-sintered ferrous metal parts produced by the process of this invention have exceptionally high bond strength. This same procedure can be used to bond materials other than rubber such as plastics, leathers, etc. to ferrous metals. Thus, the ferrous metal is first coated with magnetic ferritic oxide and then a layer of adhesive is applied to either the oxide coated surface or to the surface of the other material or to both surfaces to be bonded and the materials brought into adherent contact.

The process of this invention places no restriction on the type of rubber which can be bonded via the process onto ferrous metal. Thus, it may be a natural rubber (hard or soft) as polymerized isoprene, or a synthetic rubber such as, for example, polymerized chloroprene, polymerized butadiene or butadiene styrene copolymer, acrylonitrile butadiene copolymer, butyl rubber or silicone rubber. Naturally, other compounding agents such as plasticizers and antioxidants will be present along with the basic rubber stock. Likewise, any of the conventional rubber adhesives may be used as the bonding agent, as for example, chlorinated rubber, rubber hydrohalides such as are sold under the trademark Ty-plys, polyisocyanates such as triisocyanate triphenylmethane and diisocyanate diphenylmethane, polymers of dichlorobutadiene and copolymers prepared from a mixture of one or more polymerisable conjugated di-olefinic compounds such as isoprene, butadiene and 2,2-dimethyl butadiene, and one or more monoolefinic compounds incorporating a nitrogen-containing ring such as vinyl and isopropenyl pyridine, picolines and quinolines as for example, 2-vinyl-5-ethyl-pyridine, 2-vinyl pyridine, 2-vinyl-4,5-dichloropyridine, 2-vinyl quinoline and 2-isopropenyl-4-methyl-5-chloropyridine. Successful application of the process of this invention is obtainable with any good grade rubber cement.

The following example is provided so as to more clearly illustrate the method of this invention to those skilled in the art and should not be employed to restrict the invention as disclosed and claimed herein.

Example I

A powdered iron-carbon metal alloy having the composition shown below in Table A was compacted in a 50 ton press and then sintered for about one-hour at a temperature of about 2100° F. The thus produced sintered ferrous metal part had a surface area of about three square inches and the metal had an overall density of about 6.0 grams per cubic centimeter, an ultimate tensile strength of about 15,000 pounds per square inch and an elongation of about 1.5 percent.

A blended natural rubber compound having the composition shown below in Table B was bonded to the above described sintered ferrous metal part by the process of this invention. In this process, several hundred sintered metal parts, prepared as described above, were placed in a furnace which was at a temperature of 700° F. When the metal part had obtained furnace temperature, steam was introduced at a pressure of about 5 pounds per square inch gage and was circulated through the furnace and allowed to escape therefrom. At the same time the steam was introduced, the furnace was heated to 1050° F. and held at this temperature for one-hour. At the end of this period the furnace was allowed to cool to 700° F. and the steam was then turned off. The metal parts were then taken from the furnace and allowed to cool in air to room temperature. Inspection of the parts revealed that a uniform, tenacious layer, approximately 0.2 mil in thickness, of magnetic ferritic oxide ($Fe_3O_4$) had formed over the entire surface of the sintered metal parts.

The oxide coated metal parts described above were then sprayed with a primer adhesive [1] so as to form a thin uniform coat of the primer on the oxide coated metal surface. As soon as the primer adhesive had dried, a cover coat of adhesive [2] was sprayed over the surface of the primer adhesive and allowed to dry. Both spray applications were done at atmospheric pressure and room temperature.

The sintered metal parts having two coats of adhesive
(See footnotes 1 and 2, column 5)

bonded to the oxide coated surface thereof were then placed into a molding machine along with unvulcanized rubber stock of the composition shown in Table B. In the mold, which operated at a temperature of about 320° F. and a pressure of about 10,000 pounds per square inch, the rubber stock was forced, in the form of a liquid paste, into contact with the adhesive on the surface of the metal parts. At the end of a period of about 15 minutes, the bonded rubber-sintered ferrous metal parts were taken from the mold.

TABLE A.—POWDERED METAL COMPOSITION

| | | |
|---|---|---|
| Total carbon | percent max | 0.5 |
| Combined carbon | do | 0.25 |
| Manganese | do | 0.5 |
| Total silicon | do | 0.3 |
| Total aluminum | do | 0.2 |
| Phosphorus | do | 0.05 |
| Sulfur | do | 0.05 |
| Total other elements | do | 1.0 |
| Iron | percent min | 97.4 |

TABLE B.—RUBBER COMPOSITION

| | Parts |
|---|---|
| Styrene butadiene rubber 1500 | 25 |
| Natural rubber, #1 smoked sheet | 75 |
| Zinc oxide | 5 |
| Antioxidant | 5 |
| Antiozonant | 3 |
| Carbon black (FEF) | 50 |
| Stearic acid | 2 |
| Plasticizer | 5 |
| Benzothiazyl disulfide | 1 |
| Bismuth | 0.2 |
| Sulfur | 2 |

[1] The primer adhesive used was Chemlok 205 marketed by the Hughson Chemical Company of Erie, Pa. This material is a mixture of polymers, organic compounds, and mineral fillers in a methyl isobutyl ketone solvent system. It is gray in color and has a solids content of 22–26%, a specific gravity 0.92–0.94 at 72° F., a flash point of 80° F. (Tayliabue open cup) and a viscosity of 100–130 cps. (Brookfield Model LVF, #2 Spindle, 30 r.p.m., 72°F.). To facilitate spraying, this material was diluted with methyl isobutyl ketone.

[2] The coating adhesive used was Chemlok 220 marketed by the Hughson Chemical Company of Erie, Pa. This material is dissolved organic polymers and dispersed fillers in a xylene and perchloroethylene solvent system. It is black in color and has a solids content of 23–27%, a specific gravity of 1.03–1.10 at 72° F., a flash point of 79° F. closed cup–89° F. open cup, and a viscosity of 45 to 60 seconds (Zohn #2 cup at 72° F.). To facilitate spraying, this material was diluted with xylene.

The bonded rubber-sintered ferrous metal parts produced according to the above process consistently pass an 800 pound shear test and those that were subsequently tested to total destruction failed at 3500 pounds.

It will be apparent from the foregoing description that the objects of this invention have been obtained. A new process for the bonding of materials to ferrous metal surfaces has been provided based on the discovery that a particular form of iron oxide, heretofore thought to be undesirable in bonding, is in fact highly beneficial.

We claim:

1. A process for bonding organic compositions to ferrous metal surfaces which comprises heating and contacting the ferrous metal surfaces with a gaseous oxidizing agent so as to form a coating of magnetic iron oxide ($Fe_3O_4$) on the surface of the metal and applying the organic composition to the oxide coated surface.

2. A process for bonding organic compositions to a ferrous metal which comprises heating the metal surface to a minimum temperature of 400° F., contacting the heated surface with a gaseous oxidizing agent so as to form a coating of magnetic iron oxide ($Fe_3O_4$) on the surface of the metal and applying the organic composition to the oxide coated surface.

3. The process of claim 2 wherein the metal is a sintered ferrous metal.

4. The process of claim 2 wherein the oxidizing agent is selected from the group consisting of steam, oxygen, carbon dioxide and mixtures of the foregoing.

5. The process of claim 2 wherein the organic composition is an adhesive.

6. A process for bonding organic compositions to sintered ferrous metal which comprises heating the metal surface to a minimum temperature of 400° F., contacting the heated surface with steam so as to form a coating of magnetic iron oxide ($Fe_3O_4$) on the surface of the metal and applying the organic composition to the oxide coated surface.

7. The process of claim 6 wherein the metal surface is heated to a temperature in the range of about 700° F. to about 1200° F.

8. The process of claim 6 wherein the ferrous metal is contacted with steam for a period in the range of about 5 to 150 minutes.

9. A process for bonding rubber to sintered ferrous metal which comprises heating the metal surface to a minimum temperature of about 400° F., contacting the heated surface with a gaseous oxidizing agent so as to form a coating of magnetic iron oxide ($Fe_3O_4$) on the surface of the metal, applying at least one layer of adhesive to the oxide coated surface and applying said rubber in adherent relation to the adhesive coated surface.

10. A process for binding rubber to sintered ferrous metal which comprises heating the metal surface to a minimum temperature of 400° F. contacting the heated surface with steam so as to form a coating of magnetic iron oxide ($Fe_3O_4$) on the surface of the metal, applying at least one layer of adhesive to the oxide coated surface and applying said rubber in adherent relation to the adhesive coated surface.

11. The process of claim 10 wherein the rubber is selected from the group consisting of natural rubber, synthetic rubber and mixtures of the foregoing.

12. The process of claim 10 wherein the metal surface is heated to a temperature in the range of about 700° F. to about 1200° F.

13. A process for bonding a rubber material to sintered ferrous metal which comprises heating the metal surface to a temperature in the range of about 700° F. to about 1200° F., contacting the heated surface in the absence of air with steam so as to form a coating of magnetic iron oxide ($Fe_3O_4$) on the surface of the metal, applying at least one layer of adhesive to the oxide coated surface and applying said rubber material to the adhesive coated surface by means of heat and pressure.

14. A process for bonding together two materials at least one of which is a ferrous metal which comprises heating the ferrous metal to a minimum temperature of about 400° F., contacting the heated ferrous metal with a gaseous oxidizing agent so as to form a coating of magnetic iron oxide ($Fe_3O_4$) on the surface of the ferrous metal, applying at least one layer of adhesive to the surface of at least one of the materials, and contacting said materials so that the adhesive is in contact with the oxide coated surface and is interposed between said materials.

15. An article of manufacture comprising a ferrous metal, a layer of magnetic iron oxide ($Fe_3O_4$) covering a surface of said metal and rubber adhesively secured to said iron oxide covered surface, said iron oxide layer being formed by heating the ferrous metal surface to a minimum temperature of 400° F. and contacting the heated surface with a gaseous oxidizing agent.

References Cited

UNITED STATES PATENTS

| | | | |
|---|---|---|---|
| 1,036,576 | 8/1912 | Daft | 161—225 X |
| 1,801,667 | 4/1931 | Gray | 161—239 X |
| 1,883,973 | 10/1932 | Kurtz | 161—225 |
| 2,459,744 | 1/1949 | Rafter | 161—225 X |
| 2,516,986 | 8/1950 | Heinse | 161—225 X |
| 2,561,061 | 7/1951 | Leuzarder et al. | 161—225 X |
| 2,862,845 | 12/1958 | Szegvari | 161—239 X |

HAROLD ANSHER, *Primary Examiner.*